United States Patent
Yao (10) Patent No.: US 11,108,241 B2
(45) Date of Patent: Aug. 31, 2021

(54) POWER CONVERSION CIRCUIT, INVERSION CIRCUIT, PHOTOVOLTAIC POWER SYSTEM AND CONTROL METHOD

(71) Applicant: Silergy Semiconductor Technology (Hangzhou) LTD, Hangzhou (CN)

(72) Inventor: Kaiwei Yao, Sunnyvale, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/376,168

(22) Filed: Apr. 5, 2019

(65) Prior Publication Data
US 2019/0326757 A1 Oct. 24, 2019

Related U.S. Application Data

(60) Provisional application No. 62/661,235, filed on Apr. 23, 2018.

(30) Foreign Application Priority Data

Oct. 26, 2018 (CN) .......................... 201811254483.2

(51) Int. Cl.
*H02M 1/32* (2007.01)
*H02J 3/38* (2006.01)
(Continued)

(52) U.S. Cl.
CPC .............. *H02J 3/383* (2013.01); *H02M 1/08* (2013.01); *H02M 3/158* (2013.01);
(Continued)

(58) Field of Classification Search
CPC ........ H02J 3/383; H02J 2300/24; H02J 3/381; H02M 2001/0009; H02M 3/156;
(Continued)

(56) References Cited

U.S. PATENT DOCUMENTS

| 6,031,736 A | 2/2000 | Takehara et al. |
| 7,595,616 B2 | 9/2009 | Prexl et al. |

(Continued)

FOREIGN PATENT DOCUMENTS

| CN | 104158219 A | 11/2014 |
| CN | 106130434 A | 11/2016 |

*Primary Examiner* — Jared Fureman
*Assistant Examiner* — Esayas G Yeshaw
(74) *Attorney, Agent, or Firm* — Michael C. Stephens, Jr.

(57) ABSTRACT

A method of controlling a photovoltaic power system, can include: controlling a first current flowing through a connection line between an output terminal of a power conversion circuit and an input terminal of an inversion circuit according to a rapid shutdown signal; and controlling operation states of the power conversion circuit coupled to a photovoltaic panel in accordance with the first current, such that a voltage on the connection line meets preset requirements. A photovoltaic power system can include: an inversion circuit configured to be controlled to regulate a first current of an input line of the inversion circuit; and at least one power conversion circuit coupled in series with the input line, and being configured to transition among different operation states according to the first current.

17 Claims, 9 Drawing Sheets

(51) Int. Cl.
  *H02S 40/32*     (2014.01)
  *H02M 1/08*      (2006.01)
  *H02M 3/158*     (2006.01)
  *H02M 7/5387*    (2007.01)
  *H02M 1/00*      (2006.01)

(52) U.S. Cl.
  CPC ......... *H02M 7/53873* (2013.01); *H02S 40/32* (2014.12); *H02M 2001/0009* (2013.01)

(58) Field of Classification Search
  CPC .... H02M 1/08; H02M 7/53873; H02M 3/158; H02M 7/5387; H02M 1/36; H02S 50/00; H02S 40/32
  See application file for complete search history.

(56) References Cited

U.S. PATENT DOCUMENTS

| | | | |
|---|---|---|---|
| 7,719,140 | B2 | 5/2010 | Ledenev et al. |
| 8,461,811 | B2 | 6/2013 | Porter et al. |
| 8,946,937 | B2 | 2/2015 | Stratakos et al. |
| 9,257,916 | B2 | 2/2016 | Cheng et al. |
| 9,450,513 | B2 * | 9/2016 | Ohori ................. H02M 7/5395 |
| 9,466,737 | B2 | 10/2016 | Ledenev |
| 10,396,593 | B1 * | 8/2019 | Judkins ................. H02S 40/32 |
| 2011/0316346 | A1 * | 12/2011 | Porter ..................... H02J 3/383 |
| | | | 307/82 |
| 2014/0103892 | A1 | 4/2014 | McJimsey et al. |
| 2015/0372596 | A1 | 12/2015 | McJimsey et al. |
| 2016/0329716 | A1 * | 11/2016 | Inoue ..................... H02J 3/381 |
| 2017/0222542 | A1 * | 8/2017 | Adest ..................... G01S 3/7861 |
| 2019/0074768 | A1 * | 3/2019 | Yu ........................... H02J 3/383 |

* cited by examiner

POWER CONVERSION CIRCUIT, INVERSION CIRCUIT, PHOTOVOLTAIC POWER SYSTEM AND CONTROL METHOD

RELATED APPLICATIONS

This application claims the benefit of U.S. Provisional Patent Application No. 62/661,235, filed on Apr. 23, 2018, and of Chinese Patent Application No. 201811254483.2, filed on Oct. 26, 2018, both of which are incorporated herein by reference in their entirety.

FIELD OF THE INVENTION

The present invention generally relates to the field of power electronics technology, and more particularly to power conversion circuits, inversion circuits, photovoltaic power systems, and associated control methods.

BACKGROUND

In a photovoltaic power system, the voltage of photovoltaic panels coupled in series can be relatively high. In order to improve the safety of the photovoltaic power system, a rapid shutdown device is typically installed in the photovoltaic power system to disconnect the electrical connection between the photovoltaic modules (e.g., photovoltaic panels, power conversion circuits, an inversion circuit, etc.), such that the voltage between the electric conductors within a certain distance does not exceed a predetermined safety value. For example, the National Electrical Code (NEC) in article 690.12 requires that within 30 seconds after the shutdown of the photovoltaic power system, the voltage of the system should be less than 30V beyond 1 foot of the photovoltaic panel array boundary, and less than 80V within the photovoltaic array boundary. Since the electrical connection between the photovoltaic modules needs to be disconnected, communication is required between the photovoltaic modules in order to realize rapid shutdown and restart of the system. However, the photovoltaic power system often utilizes power lines or wireless communication ways to communicate with each other, resulting in a relatively complex and high-cost structure.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In one embodiment, a method of controlling a photovoltaic power system, can include: (i) controlling a first current flowing through a connection line between an output terminal of a power conversion circuit and an input terminal of an inversion circuit according to a rapid shutdown signal; and (ii) controlling operation states of the power conversion circuit coupled to a photovoltaic panel in accordance with the first current, such that a voltage on the connection line meets preset requirements.

In one embodiment, a photovoltaic power system can include: (i) an inversion circuit configured to be controlled to regulate a first current of an input line of the inversion circuit; and (ii) at least one power conversion circuit coupled in series with the input line, and being configured to transition among different operation states according to the first current.

In one embodiment, a power conversion circuit coupled to a photovoltaic panel of a photovoltaic power system, can include: (i) a power stage circuit; (ii) a control circuit configured to control operation states of the power conversion circuit in accordance with a first current of an output line of the power conversion circuit; (iii) where the control circuit is configured to control the power conversion circuit to switch to a first operation state when the first current is less than a predetermined first value for a predetermined duration; and (iv) where an output voltage of the power conversion circuit decreases to a first preset value in the first operation state.

Figure 1:
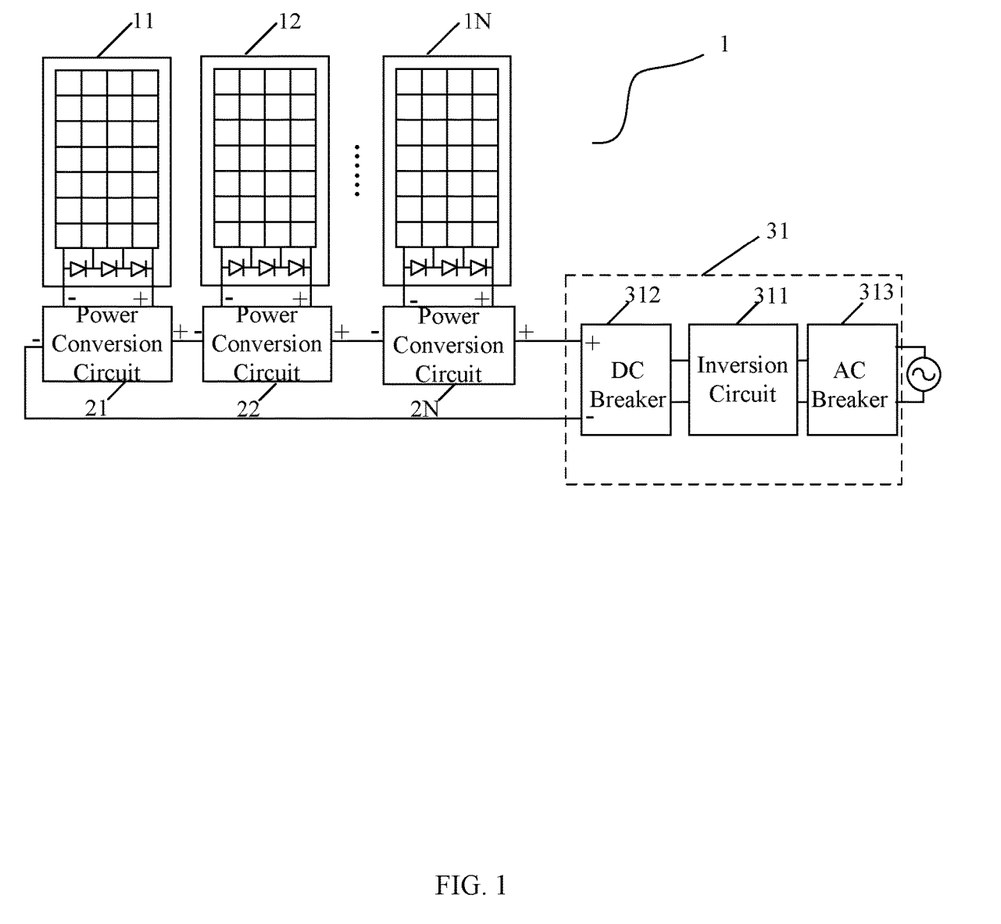
FIG. 1 is a schematic block diagram of an example photovoltaic power system, in accordance with embodiments of the present invention.

Referring now to FIG. 1, shown is a schematic block diagram of an example photovoltaic power system in accordance with embodiments of the present invention. In this particular example, a string inverter may be utilized to achieve rapid shutdown of the photovoltaic power system. Photovoltaic power system 1 can include photovoltaic panels 11-1N (N>1), power conversion circuits 21-2N, and string inverter 31. Power conversion circuits 21-2N can be relatively simple electronically controlled switches, or power converters with any topologies. Each photovoltaic panel can be coupled to a power conversion circuit, and all power conversion circuits 21-2N can be coupled in series to string inverter 31. String inverter 31 can include inversion circuit 311, DC breaker 312, and AC breaker 313, where DC breaker 312 and AC breaker 313 can be used for rapid shutdown. Also, DC breaker 312 and/or AC breaker 313 can be placed outside string inverter 31. Further, string inverter 31 may have more than one series input port, and other DC or AC breakers can be placed on the energy transmission line.

It should be understood that the disconnection of the AC source can immediately disconnect the output of string inverter 31, but the input port of string inverter 31 may still have a high voltage to supply power. Therefore, string inverter 31 and all power conversion circuits need to communicate, in order to cut off the inputs of power conversion circuits from the photovoltaic panels, or to reduce the output voltage of the power conversion circuits, such that each component in the photovoltaic power system meets preset safety regulations. In addition, if the rapid shutdown is reset, string inverter 31 and all power conversion circuits may communicate again for the photovoltaic power system to restart. In particular embodiments, the communication between each circuit in the photovoltaic power system can be realized according to the current change on the connection line by reusing a simple logic circuit and the power stage circuit, thereby achieving a relatively simple and low-cost circuit structure.

Figure 2:
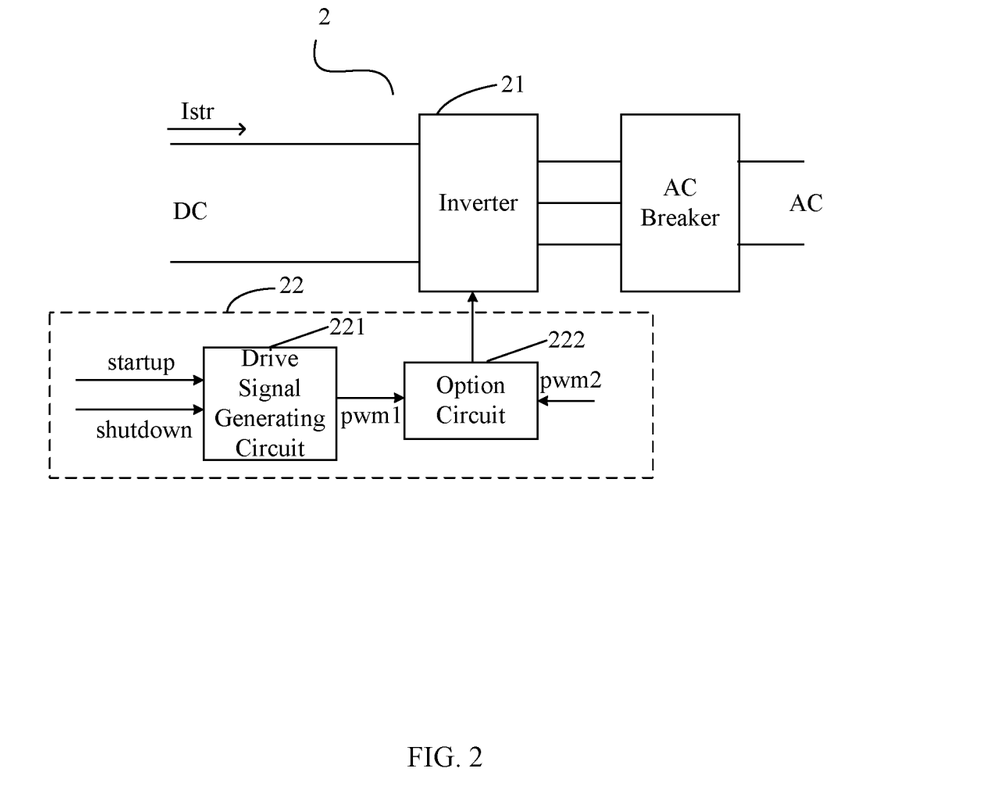
FIG. 2 is a schematic block diagram of a first example inversion circuit, in accordance with embodiments of the present invention.

Referring now to FIG. 2, shown is a schematic block diagram of a first example inversion circuit, in accordance with embodiments of the present invention. In this particular example, inversion circuit 2 can include inverter 21 and control circuit 22. Control circuit 22 can control inverter 21 to regulate current Istr on the input line of inversion circuit 2. Further, control circuit 22 can be out of operation when rapid shutdown signal 'shutdown' is active (e.g., inversion circuit 2 is in a first inversion state), such that current Istr decreases to zero to achieve rapid shutdown.

Control circuit 22 can also control inverter 21 to sink current Istr at least once in each sinking current period when rapid shutdown signal shutdown and inversion circuit startup signal 'startup' are inactive (e.g., inversion circuit 2 is in a second inversion state). During each sinking current period, current Istr may be greater than a predetermined first value for at least a period of time. The predetermined first value can be set within a range from zero to the peak value of current Istr based on circuit parameters. Therefore, the power conversion circuit in the photovoltaic power system can obtain the information about shutdown or restart by detecting the change of current Istr, thereby achieving communication between the inversion circuit and the power conversion circuits. Control circuit 22 can also control inverter 21 to supply energy to the AC side when inversion circuit startup signal startup is active (e.g., inversion circuit 2 is in a third inversion state), such that current Istr is greater than the predetermined first value whereby the photovoltaic system starts operating normally.

In this example, control circuit 22 can include drive signal generating circuit 221 and option circuit 222. Drive signal generating circuit 221 can generate drive signal pwm1 according to rapid shutdown signal shutdown and inversion circuit startup signal startup, in order to control switches of inverter 21, such that current Istr may decrease to zero or inverter 21 can sink current from the input line to make current Istr greater than the predetermined first value. Option circuit 222 can switch drive signals pwm1 and pwm2 to change the operation states of inverter 21, where drive signal pwm1 is used to control the switches of inverter 21 during the shutdown period of the photovoltaic power system, and drive signal pwm2 is used to control the switches of inverter 21 during the normal operation of the photovoltaic power system.

Figure 3:
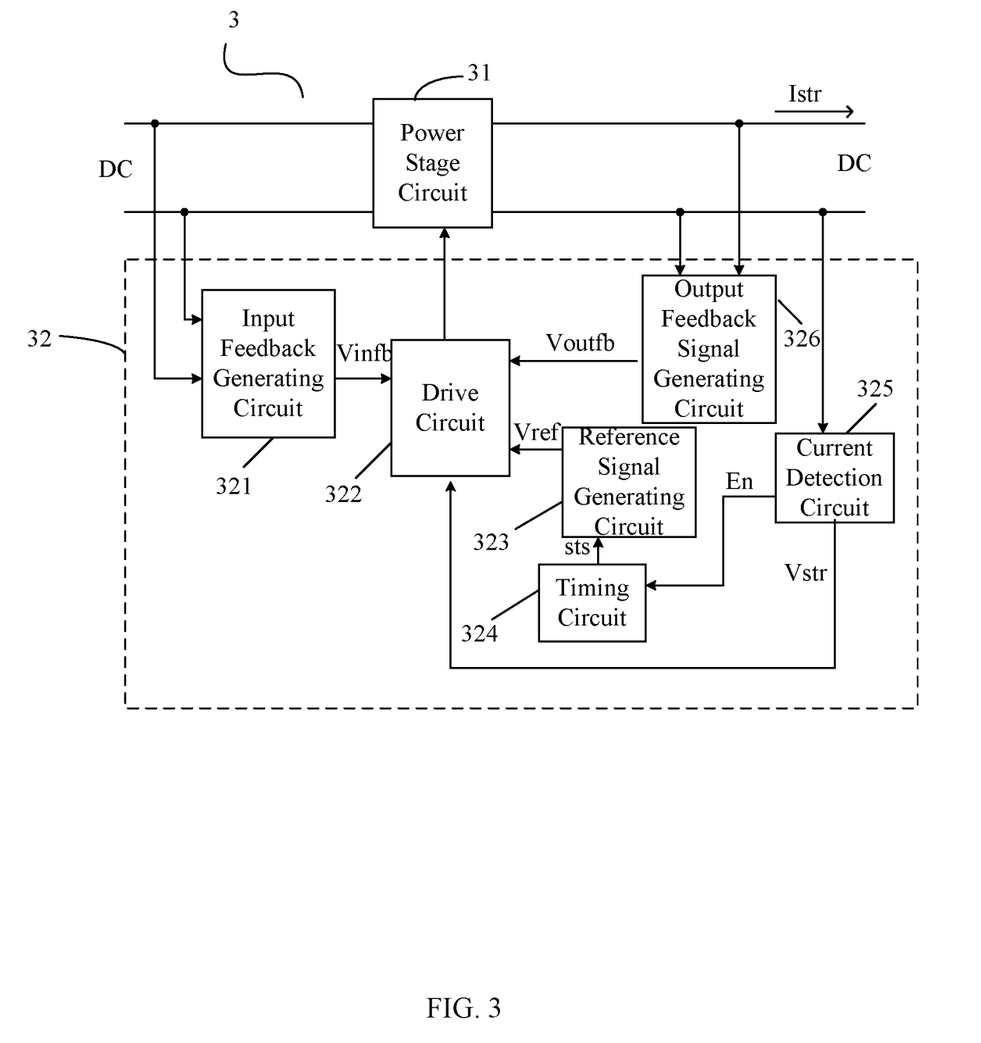
FIG. 3 is a schematic block diagram of a first example power conversion circuit, in accordance with embodiments of the present invention.

Referring now to FIG. 3, shown is a schematic block diagram of a first example power conversion circuit, in accordance with embodiments of the present invention. In this particular example, power conversion circuit 3 can include power stage circuit 31 and control circuit 32. Control circuit 32 can control operation states of power stage circuit 31 in accordance with current Istr of the output line of power conversion circuit 3 (e.g., the input line of inversion circuit 2). Further, control circuit 32 can control an output voltage of power conversion circuit 3 to decrease to a first preset value when current Istr is less than the predetermined first value for a predetermined time. At this time, power stage circuit 31 is in a first operation state. That is, when inverter 21 is controlled to be out of operation according to active rapid shutdown signal "shutdown," current Istr may decrease to zero and be maintained at zero. After current Istr is maintained at zero for the predetermined time, the output voltage of power conversion circuit 3 can be controlled to decrease to the first preset value, such that the voltage between power conversion 3 and inversion circuit 2 meets preset safety regulations. It should be understood that the first preset value can be a relatively small preset value, such that the power conversion circuit has enough energy to supply power to the inversion circuit. Also, the first preset value may be set according to the power supply voltage of the inversion circuit in some applications.

In this example, control circuit 32 can also control the output voltage of power conversion circuit 3 to increase to a second preset value when current Istr transitions from a value less than the predetermined first value to a value greater than the predetermined first value. At this time, power stage circuit 31 is in a second operation state. When inverter 21 is in the second inversion state, inverter 21 can be controlled to sink the current from the input line such that current Istr can transition from a value less than the predetermined first value to the value greater than the predetermined first value. Then, the switches of power stage circuit 31 can be controlled to increase the output voltage of power conversion circuit 3 to the second preset value. The second preset value can characterize the output voltage of each power conversion circuit when the photovoltaic power system works normally. It should be understood that inversion circuit 2 can also sink the current from the input line for a plurality of times, such that each power conversion circuit can detect the change of current Istr and maintain in the second operation state before the active inversion circuit startup signal arrives, thereby improving the reliability of the communication between power conversion circuit 3 and inversion circuit 2.

In this example, control circuit 32 can include input feedback signal generating circuit 321, drive circuit 322, reference signal generating circuit 323, timing circuit 324, current detection circuit 325, and output feedback signal generating circuit 326. Input feedback signal generating circuit 321 can generate input feedback signal Vinfb characterizing an input voltage of power stage circuit 31. Output feedback signal generating circuit 326 can generate output feedback signal Voutfb characterizing the output voltage of power stage circuit 31. Current detection circuit 325 can generate current sampling signal Vstr characterizing current Istr and compare current sampling signal Vstr against the predetermined first value to generate enable signal En. Timing circuit 324 can time according to enable signal En and generate state signal sts. Reference signal generating circuit 323 may adjust output voltage reference signal Vref of power stage circuit 31. Drive circuit 322 can adjust the output voltage of power stage circuit 31 by controlling the switches of power stage circuit 31 according to input feedback signal Vinfb, output feedback signal Voutfb, current sampling signal Vstr, and output voltage reference signal Vref.

In some applications, the first current of the connection line between the output terminal of the power conversion circuit and the input terminal of the inversion circuit can be controlled based on the rapid shutdown signal. Then, the state of the power conversion circuit coupled to the photovoltaic panel may be controlled in accordance with the first current, such that the voltage on the connection line can meet the preset requirements. Therefore, the rapid shutdown of the photovoltaic power system can be achieved and system communication can be simplified.

Figure 4:
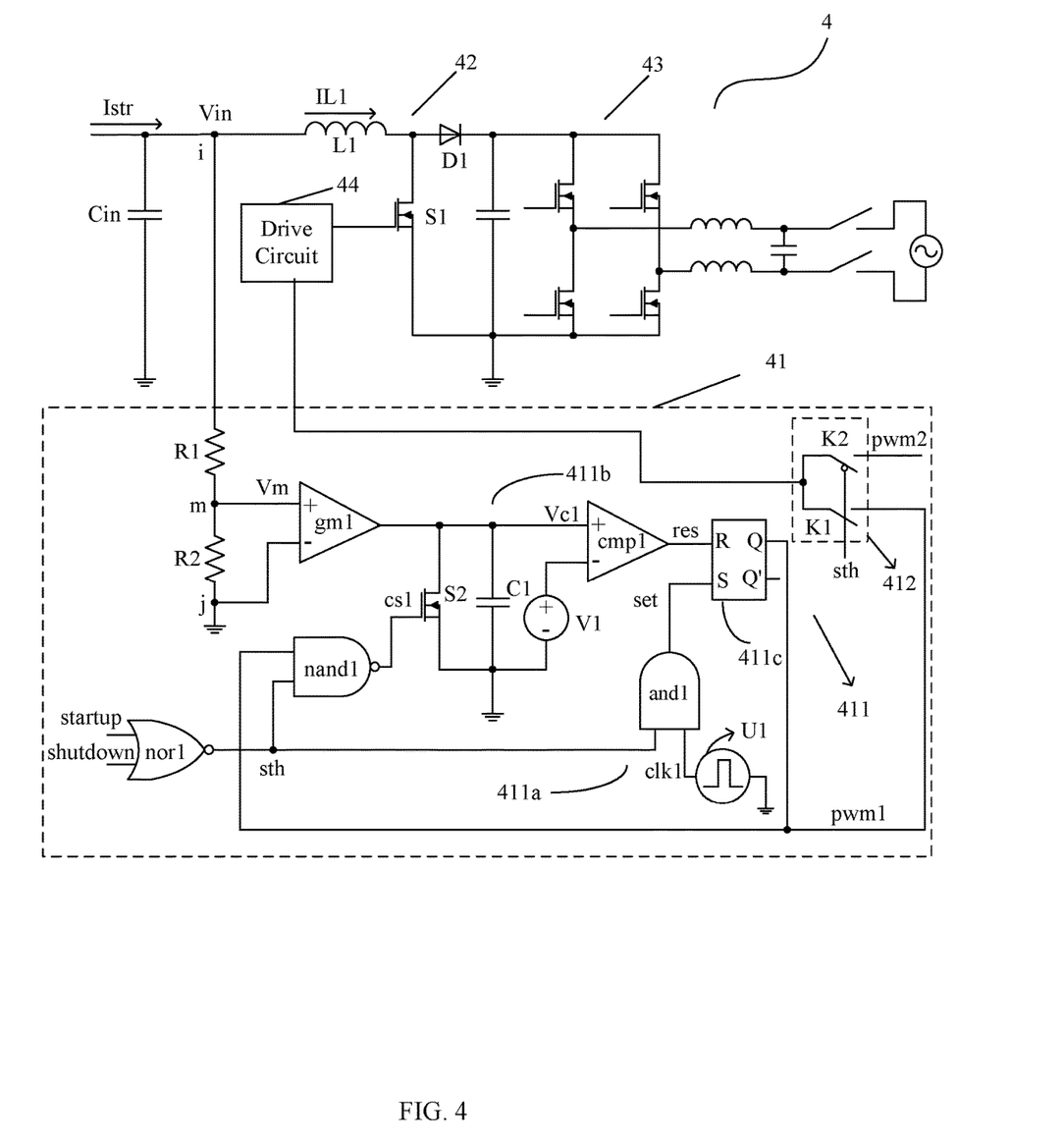
FIG. 4 is a schematic block diagram of a second example inversion circuit, in accordance with embodiments of the present invention.

Referring now to FIG. 4, shown is a schematic block diagram of a second example inversion circuit, in accordance with embodiments of the present invention. In this particular example, inversion circuit 4 can include control circuit 41 and two-stage inverter. The first stage is boost converter 42 (e.g., boost type topology) and the second stage is bridge inverter 43. Boost converter 42 can include inductor L1, switch S1, and diode D1. Control circuit 41 can include drive signal generating circuit 411 that can generate drive signal pwm1, and option circuit 412. Drive signal generating circuit 411 can include set signal generating circuit 411a, reset signal generating circuit 411b, RS flip-flop 411c, and NOR-gate nor1. NOR-gate nor1 can generate enable signal sth according to rapid shutdown signal shutdown and inversion circuit startup signal startup. Set signal generating circuit 411a can include AND-gate and1 and clock generator U1, and may generate set signal 'set' according to enable signal sth and clock signal clk1 generated by clock generator U1. RS flip-flop 411c can set drive signal pwm1 when receiving set signal set. Also, reset signal generating circuit 411b can generate reset signal res for RS flip-flop 411c to reset.

Reset signal generating circuit 411b can include resistors R1 and R2, error amplifier gm1, NAND-gate nand1, switch S2, capacitor C1, voltage source V1, and comparator cmp1. Resistors R1 and R2 can connect between input terminal i and ground terminal j of boost converter 42. Input terminals of error amplifier gm1 can respectively connect to common terminal m of resistors R1 and R2 and ground terminal j, and an output terminal of error amplifier gm1 can connect to an input terminal (e.g., non-inverting input terminal) of comparator cmp1. NAND-gate nand1 can generate switch control signal cs1 for switch S2 according to enable signal sth and drive signal pwm1. Switch S2 and capacitor C1 can connect in parallel between the output terminal of error amplifier gm1 and ground terminal j. Voltage source V1 can connect between the other input terminal (e.g., inverting input terminal) of comparator cmp1 and ground terminal j. Comparator cmp1 can compare voltage Vc1 of capacitor C1 against voltage source V1 to generate reset signal res for RS flip-flop 411c.

Option circuit 412, including switches K1 and K2, can be controlled by enable signal sth to switch drive signals pwm1 and pwm2, in order to control the operation states of inversion circuit 4, and thereby regulate current Istr. In this example, drive signal pwm1 can control the state of inversion circuit 4 during the shutdown period of the photovoltaic power system, and drive signal pwm2 can control the state of inversion circuit 4 during the normal operation of the photovoltaic power system. That is, when enable signal sth is active, switch K1 can be turned on and switch K2 turned off, such that drive signal pwm1 may control the state of inversion circuit 4. When enable signal sth is inactive, switch K1 can be turned off and switch K2 turned on, such that drive signal pwm2 may control the state of inversion circuit 4.

In this particular example, inversion circuit 4 can also include drive circuit 44, which can control the on/off states of switch S1 according to drive signals pwm1 and pwm2, thereby adjusting current Istr. In this example, when rapid shutdown signal shutdown and inversion circuit startup signal startup are both inactive, NOR-gate nor1 can generate active enable signal sth, in order to set RS flip-flop 411c when clock signal clk1 is active, such that drive signal pwm1 generated by RS flip-flop 411c can be activated. Then, NAND-gate nand1 may generate inactive switch control signal cs1 to control switch S2 to be turned off. Correspondingly, switch K1 of option circuit 412 controlled by enable signal sth may be turned on, such that drive signal pwm1 can control switch S1. As a result, inductor current IL1 of inductor L1 of boost converter 42 can increase. Current Istr can also increase since inductor current IL1 is the current after current Istr passes through capacitor Cin. In addition, inversion circuit 4 can be controlled to sink current from the input line, such that current Istr may be greater than the predetermined first value. For example, the predetermined first value is zero.

In this example, resistors R1 and R2 can form a voltage division circuit, in order to sample sampling signal Vm characterizing inductor current IL1. Since switch S2 is turned off, the output of error amplifier gm1 may charge capacitor C1. Then, voltage Vc1 of capacitor C1 can increase to be greater than the voltage of voltage source V1. Comparator cmp1 can generate active reset signal res to reset RS flip-flop, such that drive signal pwm1 generated by RS flip-flop is inactive. Thus, switch S1 can be controlled to be turned off, and inductor current IL1 may begin to decrease, such that current Istr can also decrease. When current Istr decreases to zero, sinking current from the input line for one time can be completed.

From the above, peak value ILpeak of inductor current IL1 can be expressed as below in formula (1):

$$ILpeak = \frac{Vin}{L1} * t \tag{1}$$

Here, Vin is the input voltage of boost converter 42, and t is the energy storage time of inductor L1 (e.g., the turn-on time of switch S1). Also, energy storage time t of inductor L1 can satisfy the following formula (2):

$$\frac{\frac{Vin * R2}{R1 + R2} * Gm}{C1} * t = V1 \tag{2}$$

Here, Gm is the amplification factor for error amplifier gm1. Thus, peak value ILpeak of inductor current IL1 can be expressed as below in formula (3):

$$ILpeak = \frac{Vin}{L1} * t = \frac{C1 * V1 * (R1 + R2)}{L1 * Gm * R2} \tag{3}$$

In this particular example, peak value ILpeak of inductor current IL1 can be changed by changing the voltage of voltage source V1, such that the peak value of current Istr may also be changed. When the peak value of current Istr is large enough, the power conversion circuit can detect current Istr, in order to achieve communication between the inversion circuit and the power conversion circuit.

In another example, a current generating circuit can be included in the photovoltaic power system. The current generating circuit can be coupled to the input line of the inversion circuit to generate extra current when rapid shutdown signal and inversion circuit signal are inactive, such that current Istr can be greater than the predetermined first value. In this example, the current generating circuit can be controlled by drive signal pwm1 generated by control circuit 41 to generate the extra current, such that current Istr can be greater than the predetermined first value and the power conversion circuit can detect the first current, thereby achieving communication between the inversion circuit and the power conversion circuit. It should be understood that the first current can be in any waveform shape, such as a plurality of pulses or DC form, if the first current is greater than the predetermined first value.

Figure 5:
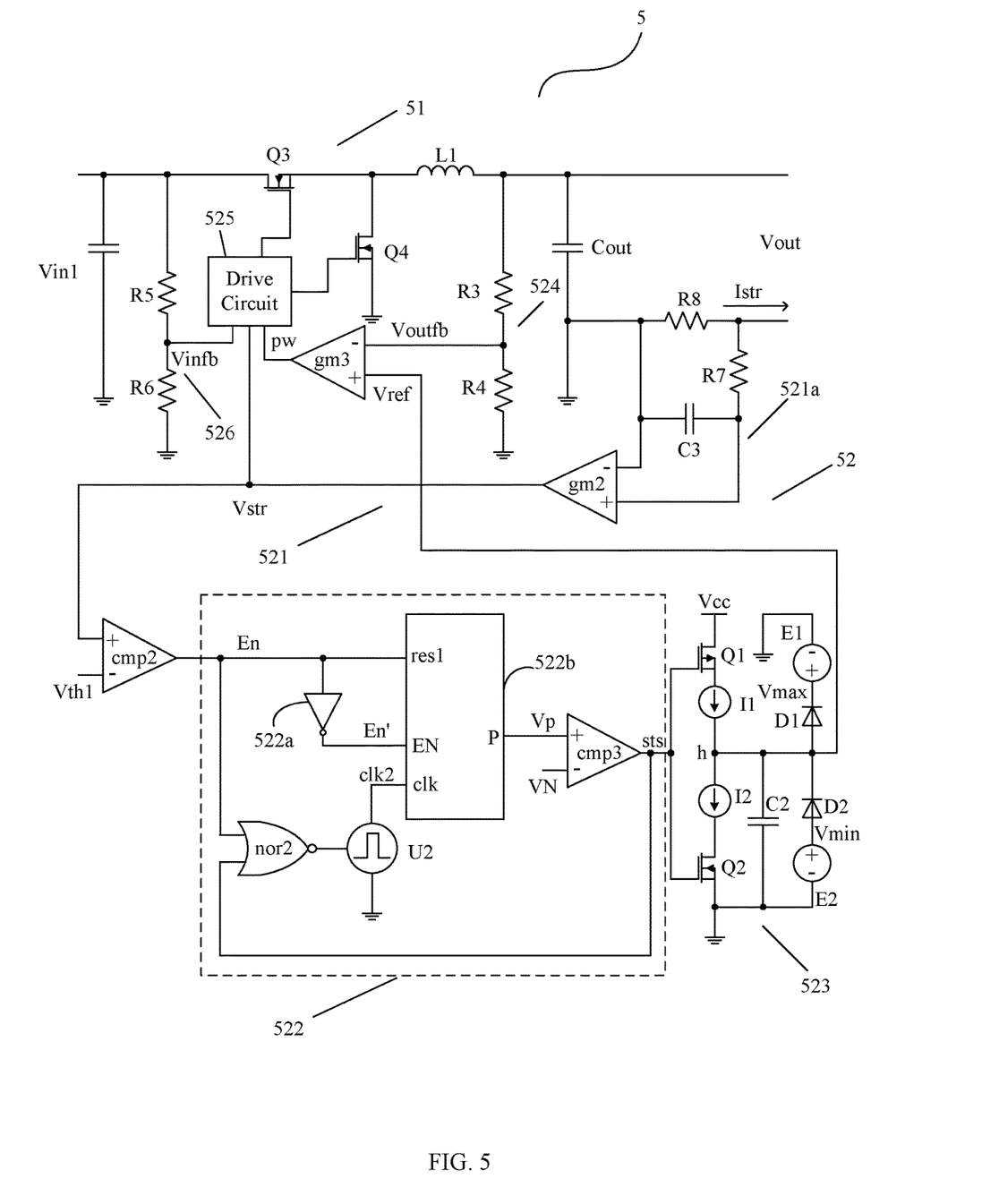
FIG. 5 is a schematic block diagram of a second example power conversion circuit, in accordance with embodiments of the present invention.

Referring now to FIG. 5, shown is a schematic block diagram of a second example power conversion circuit, in accordance with embodiments of the present invention. In this particular example, power conversion circuit 5 can include power stage circuit 51 and control circuit 52. For example, power stage circuit 51 is a DC-DC converter with a buck converter topology. Power stage circuit 51 can include switches Q3 and Q4, and inductor L1. Control circuit 52 can include current detection circuit 521, timing circuit 522, reference signal generating circuit 523, output feedback signal generating circuit 524, drive circuit 525, input feedback signal generating circuit 526, and error amplifier gm3. In one example, output feedback signal generating circuit 524 and input feedback signal generating circuit 526 can each utilize voltage division circuits. In this example, input feedback signal generating circuit 526, including resistors R5 and R6, can generate input feedback signal Vinfb characterizing the input voltage of power stage circuit 51. Output feedback signal generating circuit 524, including resistors R3 and R4, can generate output feedback signal Voutfb characterizing the output voltage of power stage circuit 51.

Current detection circuit 521 can include current sampling circuit 521a and comparator cmp2. Current sampling circuit 521a can include resistors R7 and R8, capacitor C3, and error amplifier gm2, and may obtain current sampling signal Vstr that characterizes current Istr. Comparator cmp2 can compare current sampling signal Vstr against reference threshold Vth1 to generate enable signal En, where reference threshold Vth1 may characterize the predetermined first value. It should be understood that reference threshold Vth1 can be set within a range from zero to the peak value of current sampling signal Vstr based on specific circuit parameters.

Timing circuit 522 can include Inverter 522a, NOR-gate nor2, clock generator U2, timer 522b, and comparator cmp3. When enable signal En is inactive (e.g., current Istr is less than the predetermined first value), enable signal En can be inverted to be signal En' by inverter 522a, such that signal En' is active and then timer 522b can be controlled to start timing. Comparator cmp3 can compare timing signal Vp against timing reference signal VN to generate state signal sts. Timing signal Vp can characterize a current timing time of timer 522b, and timing reference signal VN can characterize a predetermined time. It should be understood that the predetermined time may be set based on specific circuit parameters to meet the predetermined safety regulations (e.g., in NEC 690.12, the predetermined time should be less than 30 seconds). When the timing time of timer 522b reaches the predetermined time, state signal sts may become active. Then, NOR-gate nor2 can generate inactive signal to control clock generator U2 to be out of operation, such that timer 522b may be controlled to be out of operation, in order to save energy and reduce loss.

Reference signal generating circuit 523 can include current sources I1 and I2, switches Q1 and Q2, capacitor C2, diodes D1 and D2, and voltage sources E1 and E2. In this example, switch Q1 and current source I1 can connect in series between pull-up power supply Vcc and middle terminal h. Current source I2 and switch Q2 can connect in series between middle terminal h and ground. Capacitor C2 can connect in parallel with diode D2 and voltage source E2 that are coupled in series. A cathode of diode D2 can connect to middle terminal h. In this particular example, switch Q1 is a P-type MOSFET, and switch Q2 is N-type MOSFET. Thus, when state signal sts is active, switch Q2 can be turned on, such that capacitor C2 may be discharged through current source I2. Also, when state signal sts is inactive, switch Q1 can be controlled to be turned on, such that capacitor C2 may be charged by current source IL Diodes D1 and D2 and voltage sources E1 and E2 may form a clamp circuit to limit the voltage of capacitor C2 (e.g., output voltage reference signal Vref) between minimum voltage Vmin and maximum voltage Vmax.

It should be understood that minimum voltage Vmin can characterize the first preset value for output voltage Vout of the power conversion circuit, which is the output voltage of the power conversion circuit during the shutdown period of the photovoltaic power system, in order to maintain operation of the inversion circuit and to meet predetermined safety regulations. Maximum voltage Vmax can characterize a second preset value for output voltage Vout of the power conversion circuit, which is the output voltage of power conversion circuit during the normal operation of the photovoltaic power system. Error amplifier gm3 can generate drive signal pw based on output voltage reference signal Vref and output feedback signal Voutfb, in order to drive drive circuit 525 for controlling the on/off states of switches Q3 and Q4, such that the output voltage of the power conversion circuit may vary along with output voltage reference signal Vref.

Figure 6:
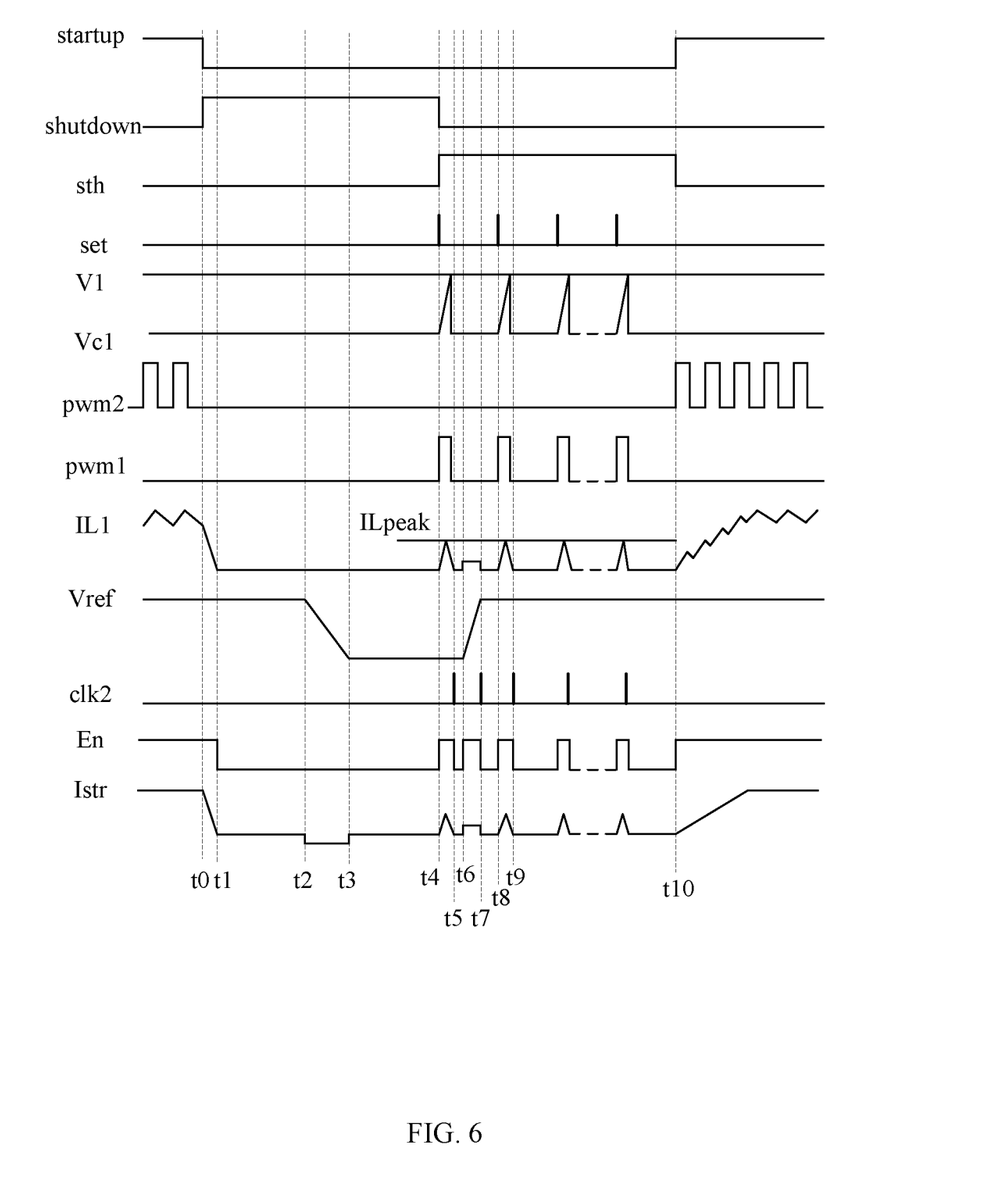
FIG. 6 is a waveform diagram of an example photovoltaic power system, in accordance with embodiments of the present invention.

Referring now to FIG. 6, shown is waveform diagram of an example photovoltaic power system, in accordance with embodiments of the present invention. In this particular example, also with reference to FIGS. 4 and 5, at time t0, the rapid shutdown of the system is triggered. That is, rapid shutdown signal shutdown may go active, such that inversion circuit 4 can be shut down and not supply energy, and then current Istr may begin to decrease. The rapid shutdown of the photovoltaic power system can be achieved by turning off the AC breaker and/or DC breaker and/or disabling inversion circuit 4. It should be understood that, the output terminal of inversion circuit 4 can effectively be disconnected when rapid shutdown signal shutdown is active. However, the input terminal of inversion circuit 4 may still have a high voltage, such that power conversion circuit 5 may still have high voltage on the input terminal. At time t1, current Istr may decrease to zero. Enable signal En generated by comparator cmp2 of power conversion circuit 5 can be inactive. Then, after enable signal En passes through inverter 522a, signal En' can be activated, such that timer 522b controlled by clock generator U2 can start timing.

At time t2, timing time of timer 522b may reach to the predetermined time, such that timing signal Vp is greater than timing reference signal VN. Then, state signal sts generated by comparator cmp3 can be activated. Therefore, switch Q2 can be controlled to be turned on at time t2, such that capacitor C2 can be discharged through current source I2 and switch Q2. The voltage of capacitor C2 (e.g., output voltage reference signal Vref) may gradually decrease to minimum voltage Vmin at time t3. Output voltage reference signal Vref may not necessarily decrease linearly, and any circuit structure that can reduce output voltage reference signal Vref in order to minimum voltage Vmin when state signal sts is active can be utilized in particular embodiments. At time t2-t3, since output voltage reference signal Vref decreases, output voltage Vout of power conversion circuit 5 may decrease due to the control of error amplifier gm3 and the drive circuit. At this time, output capacitor Cout can be discharged, such that current Istr is negative. At time t3, output voltage Vout decreases to the minimum value (e.g., the first preset value). Thereafter, output voltage reference signal Vref can be maintained at minimum voltage Vmin, and current Istr can be zero at this time. In this way, rapid shutdown of the photovoltaic power system can be achieved, and output voltage Vout of power conversion circuit 5 can meet predetermined safety regulations and may be provided to the inversion circuit to operate at the same time.

At time t4, rapid shutdown signal shutdown can be deactivated; that is, the photovoltaic power system can be controlled to restart. All the breakers (DC breakers or AC breakers) on the energy transmission path may be closed. Since the input terminal of inversion circuit 4 (e.g., the output terminal of power conversion circuit 5) has a positive voltage, inversion circuit 4 can be controlled as a load to sink the current. At this time, inversion circuit startup signal startup and rapid shutdown signal shutdown can be inactive. In this example, enable signal sth generated by NOR-gate nor1 can be active, such that switch K1 of option circuit 412 can be turned on. Also, AND-gate and1 can receive enable signal sth and clock signal clk generated by clock generator U1, and may activate set signal set in order to set RS flip-flop 411c, such that drive signal pwm1 generated by RS flip-flop 411c is active. Thus, switch S1 may be turned on and inductor current IL1 can gradually increase to peak value ILpeak. Further, when enable signal sth and drive signal pwm1 are active, switch control signal cs1 generated by NAND1-gate nand1 can be inactive, such that switch S2 can be turned off. Thus, the output of error amplifier gm1 can charge capacitor C1 to increase voltage Vc1 of capacitor C1.

When voltage Vc1 of capacitor C1 increases to be greater than the voltage of voltage source V1, comparator cmp1 may activate reset signal res to reset RS flip-flop 411c. Thus, drive signal pwm1 can become inactive and switch S1 can be turned off, such that inductor current IL1 may decrease to zero at time t5. Since drive signal pwm1 is inactive, switch control signal cs1 generated by NAND-gate nand1 can be active, such that switch S2 can be turned on, thereby decreasing voltage Vc1 of capacitor C1 to zero. Therefore, the current that inversion circuit 4 may sink can be a pulse current during period t4-t5. Since inductor current IL1 is the current after current Istr passes through capacitor Cin, current Istr may also be a similar pulse during period t4-t5. When clock signal clk1 generated by clock generator U1 arrives next time, current Istr may again be generated.

At time t4, current detection circuit 521 of power conversion circuit 5 can detect that current Istr is greater than the predetermined first value (e.g., zero). For example, the predetermined first value can be within a range from zero to the peak value of current Istr, such that current Istr can be detected. Then, enable signal En generated by comparator cmp2 can be active; that is, clear signal res1 of timer 522b is active, such that timing signal Vp generated by timer 522b can be reset to be zero. Then, state signal sts generated by comparator cmp3 may be low. Switch Q1 can be controlled to be turned on to increase the voltage of capacitor C2 (e.g., output voltage reference signal Vref), such that the system can enter a soft-start stage.

A period of delay time can be added before the system enters the soft-start stage (e.g., by a delay circuit that utilizes analog or digital circuit control), in order to make the startup of the system stable. In this example, switch Q1 can be turned on and switch Q2 turned off until time t6. Correspondingly, current source I1 may charge capacitor C2 to increase the voltage of capacitor C2 (e.g., output voltage reference signal Vref) to maximum voltage Vmax at time t7, such that the output voltage of power conversion circuit can be increased to the maximum output voltage (e.g., the second preset value) for completing startup of the photovoltaic power system.

Since current Istr is zero at time t5 and enable signal En is inactive, timer 522b can start to time. Also, the period t5-t6 is less than the predetermined time (e.g., timing signal Vp is less than timing reference signal VN), such that state signal sts can be maintained inactive and output voltage reference signal Vref may not be affected to increase after the delay time. Further, during the period t6-t7, output capacitor Cout can be charged, and current Istr is greater than zero, such that enable signal En is active to clear the timing time of timer 522b, and clock generator U2 can be disabled to save energy. If the predetermined first value is a value greater than the value of current Istr (e.g., current Istr is less than the predetermined first value in the period t6-t7), enable signal En may still be inactive, and timer 522b enabled. Only if the period of clock signal clk1 generated by clock generator U1 is less than the predetermined time of timer 522b, state signal sts can be maintained inactive and output voltage reference signal Vref can also increase to maximum voltage Vmax and be maintained at maximum voltage Vmax without decreasing.

At time t7, output voltage Vout of power conversion circuit 5 can reach the maximum value and remain unchanged thereafter as shown. Also, current Istr is zero, such that enable signal En is inactive, thereby controlling timer 522b to be enabled to start timing. At time t8, clock signal clk1 can again be activated for inversion circuit 4 to sink the current, such that current Istr may increase to be greater than zero with the increase of inductor current ILL Then, timer 522b can be controlled to stop timing. From the above, the sinking current period for inversion circuit 4 to sink the current should be less than the predetermined time of timer 522b (e.g., the period of clock signal clk1 should be less than the time corresponding to timing reference signal VN; that is, the time when current Istr is less than the predetermined first value), in order to avoid the risk that output voltage reference signal Vref may decrease during soft startup of the system due to active state signal sts. In this particular example, the inversion circuit can periodically sink the current according to clock signal clk1 to maintain output voltage reference signal Vref at maximum voltage Vmax. In each sinking current period, the inversion circuit can be controlled to sink or generate a plurality of current pulses or DC currents, as long as the time when current Istr is less than the predetermined first value may not be greater than the predetermined time of timer 522*b*.

At time t9, the inversion circuit can complete the second current sinking. By sinking the current on the input line for several times through the inversion circuit, each power conversion circuit can detect the change of current Istr to maintain in the second operation state before active inversion circuit startup signal startup arrives. In this way, the output voltage of the power conversion circuits can reach maximum output voltage for normal operation of the photovoltaic power system.

After time t10, inversion circuit startup signal startup can be activated, and enable signal sth deactivated. Then, switch K1 of option circuit 412 can be turned off and switch K2 turned on, such that drive signal pwm2 can control switch S1 of boost converter 42. Thus, inversion circuit 4 can start to supply energy. Also, current Istr can be greater than zero, and the photovoltaic power system may be in the normal operation state. During the period t4-t10, inversion circuit 4 can sink the current with a preset frequency, which can be fixed or variable frequency, or a delay time can be set within the sinking period. But, the maximum repetitive period should be less than the predetermined time of the timer. After the sinking stage is completed, all of the power conversion circuits can maintain at the maximum output voltage, such that the inversion circuit may have the input voltage for normal operation of the photovoltaic power system.

Though the increase or decrease of various currents or voltages is linear in the examples herein, it should be understood that non-linear increase or decrease of the currents or voltages can be utilized in particular embodiments. In some applications, the first current of the connection line between the output terminal of the power conversion circuit and the input terminal of the inversion circuit is controlled based on the rapid shutdown signal. Then, the state of the power conversion circuit coupled to the photovoltaic panel can be controlled in accordance with the first current, such that the voltage of the connection line can meet the preset requirements. Therefore, rapid shutdown of the photovoltaic power system can be achieved and system communication can be simplified.

Figure 7:
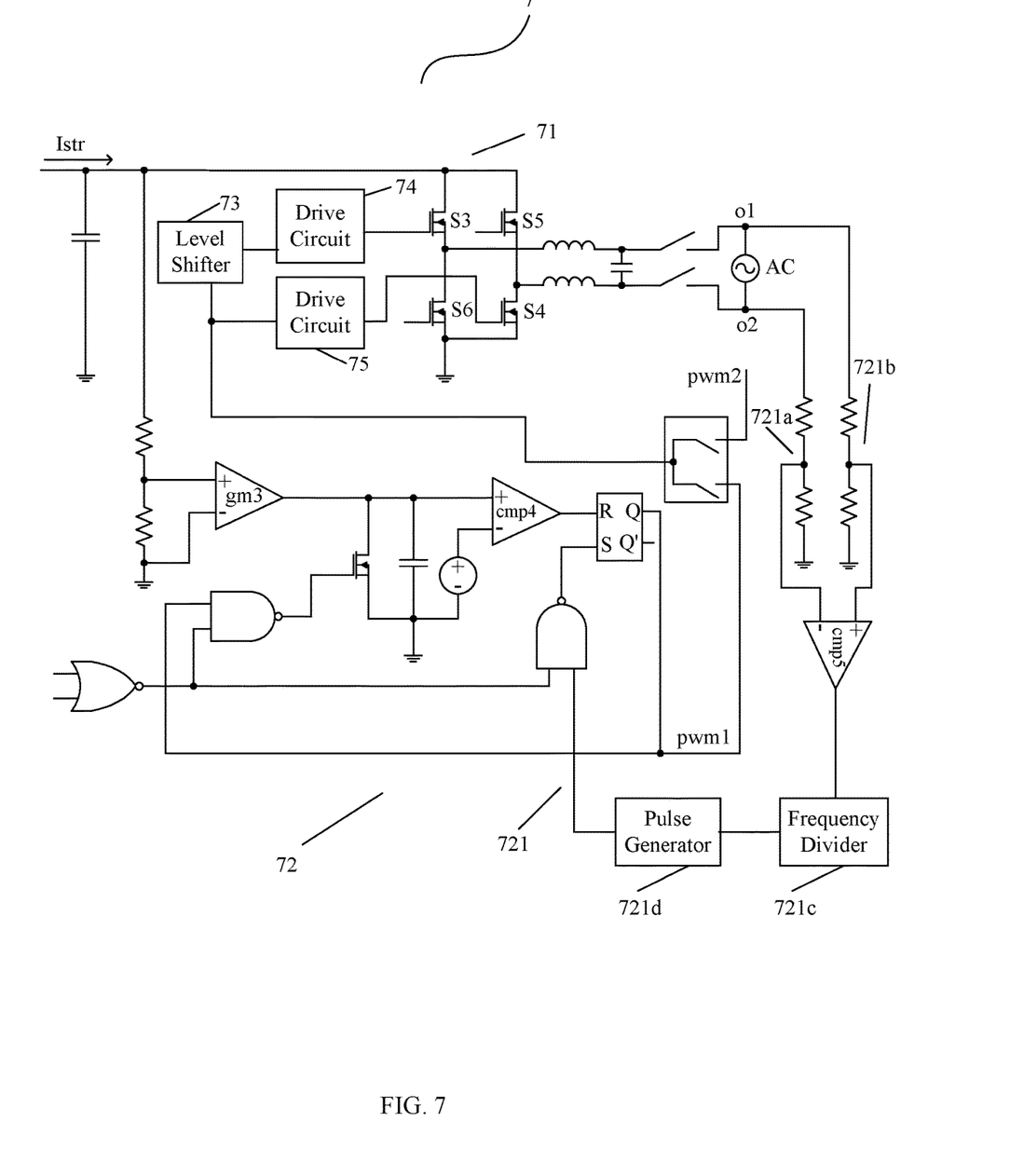
FIG. 7 is a schematic block diagram of a third example inversion circuit, in accordance with embodiments of the present invention.

Referring now to FIG. 7, shown is schematic block diagram of a third example inversion circuit, in accordance with embodiments of the present invention. In this particular example, inversion circuit 7 can be achieved by a single-stage inverter (bridge inverter) for simplifying the circuit structure and reducing cost. The control circuit can control the switches of the bridge inverter according to drive signals pwm1 and pwm2 to sink the current. In this particular example, inversion circuit 7 can include inverter 71, control circuit 72, level shifter 73, drive circuit 74, and drive circuit 75. Level shifter 73, drive circuit 74, and drive circuit 75 can control inverter 71 to sink the current with a preset frequency (fixed or variable frequency) based on drive signal pwm1 in the second inversion state, and control inverter 71 to supply energy based on drive signal pwm2 during normal operation of the photovoltaic power system. Inverter 71 can include switches S3-S6. Switches S3 and S6 can connect in series between the input terminal of the inversion circuit and ground, and switches S4 and S5 can connect in series between the input terminal of the inversion circuit and ground. Control circuit 72 can generate drive signal pwm1 to control switches S3 and S4 (or switches S5 and S6) during the shutdown period of the photovoltaic power system, in order for inverter 71 to sink the current with the preset frequency. Also, control circuit 72 can generate drive signal pwm2 to control switches S3 and S4 (or switches S5 and S6) during normal operation of the photovoltaic power system, in order for inverter 71 to supply energy.

Clock generator 721 of control circuit 72 can include voltage division circuits 721*a* and 721*b*, comparator cmp5, frequency divider 721*c*, and pulse generator 721*d*. Voltage division circuit 721*a* can be coupled between one terminal o2 of AC output port and the ground terminal. Voltage division circuit 721*b* can be coupled between the other terminal o1 of AC output port and ground. Comparator cmp5 can compare a voltage at the middle of voltage division circuit 721*a* against a voltage at the middle of voltage division circuit 712*b*. An output terminal of comparator cmp5 can connect to frequency divider 721*c*. When the AC voltage of AC source AC crosses zero (e.g., the voltage of terminal o1 is greater than the voltage of terminal o2), comparator cmp5 can generate an active signal, such that frequency divider 721*c* may control pulse generator 721*d* to generate a rising edge of the clock signal. When the AC voltage of AC source AC is less than zero (e.g., the voltage of terminal o1 is less than the voltage of terminal o2), comparator cmp5 can generate an inactive signal, such that frequency divider 721*c* may control pulse generator 721*d* to generate a falling edge of the clock signal. Any suitable implementation for the clock generator can be utilized in particular embodiments.

Figure 8:
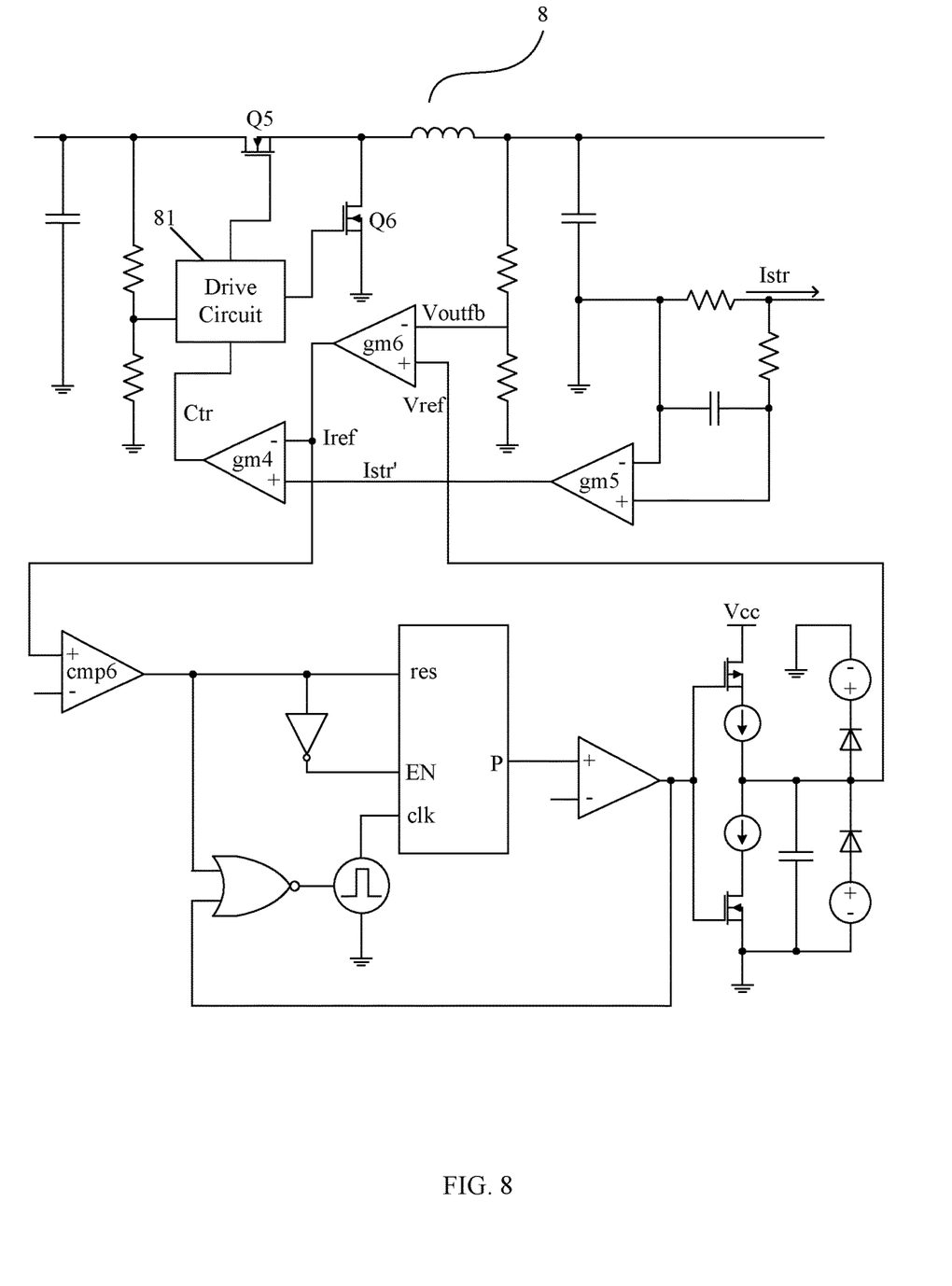
FIG. 8 is a schematic block diagram of a third example power conversion circuit, in accordance with embodiments of the present invention.

Referring now to FIG. 8, shown is a schematic block diagram of a third example power conversion circuit, in accordance with embodiments of the present invention. In this particular example, the on and off states of the switches in power conversion circuit 8 can be controlled by current-controlled mode, in order to control the output voltage of power conversion circuit 8. Power conversion circuit 8 can include error amplifiers gm4-gm6 and drive circuit 81. Error amplifier gm5 can generate current feedback signal Istr' characterizing current Istr. Error amplifier gm6 can generate current reference signal Iref according to output voltage reference signal Vref and output feedback signal Voutfb that characterizes the output voltage. Error amplifier gm4 can generate control signal Ctr according to current feedback signal Istr' and current reference signal Iref, in order to control drive circuit 81, such that the on and off states of switches Q5 and Q6 can be controlled to control the output voltage of power conversion circuit 8. In this example, current-controlled mode can be applied to control the on/off states of switches Q5 and Q6, in order to control the output voltage of power conversion circuit 8. Since current reference signal Iref is a current signal that may have a filtering effect, the malfunction can be further avoided.

Figure 9:
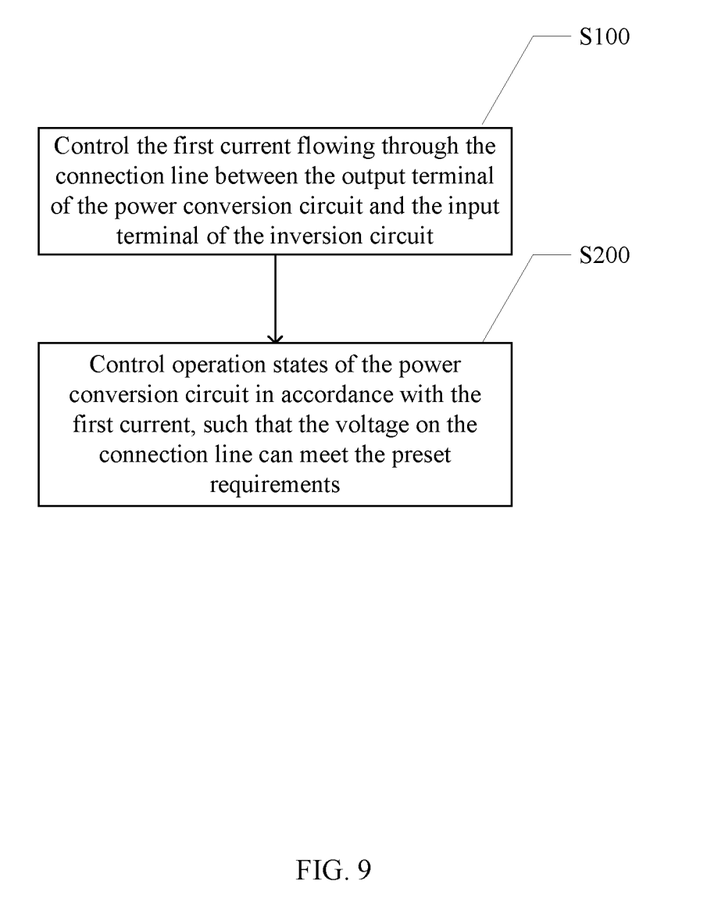
FIG. 9 is a flow diagram of an example control method of an example photovoltaic power system, in accordance with embodiments of the present invention.

Referring now to FIG. 9, shown is a flow diagram of an example control method of an example photovoltaic power system, in accordance with embodiments of the present invention. The control method can include the following steps. For example, S100 can include controlling the first current flowing through the connection line between the output terminal of the power conversion circuit and the input terminal of the inversion circuit based on a rapid shutdown signal. The power conversion circuit can be coupled to the photovoltaic panel.

In S200, the operation states of the power conversion circuit can be controlled in accordance with the first current, such that the voltage on the connection line can meet the preset requirements. For example, the preset requirements can be NEC 690.12 (e.g., according to NEC2017, after the shutdown for 30 seconds, the voltage of the photovoltaic power system should be less than 30V beyond 1 foot of the photovoltaic panel array boundary, and less than 80V within the photovoltaic panel array boundary). Further, controlling the operation states of the power conversion circuit by detecting the first current can include controlling the power conversion circuit to switch to a first operation state when the first current is less than a predetermined first value for a predetermined time, where the output voltage of the power conversion circuit decreases to the first preset value in the first operation state. The first preset value can be the minimum output voltage of the power conversion circuit.

For example, controlling the operation states of the power conversion circuit by detecting the first current can include controlling the power conversion circuit to switch to the second operation state when the first current switches from a value less than the predetermined first value to a value greater than the predetermined first value, where the output voltage of the power conversion circuit can increase to a second preset value. Further, controlling the first current based on the rapid shutdown signal can include controlling the inversion circuit to switch to a first inversion state when the rapid shutdown signal is active, where the inversion circuit stops operating in the first inversion state, such that the first current can decrease to zero.

Also, controlling the first current based on the rapid shutdown signal can include controlling the first current to be greater than the predetermined first value when the rapid shutdown signal is inactive and an inversion circuit startup signal is inactive. For example, controlling the first current to be greater than the predetermined first value can include controlling the inversion circuit to switch to a second inversion state and controlling the inversion circuit to sink the first current at least once in each sinking current period, such that the first current is greater than the predetermined first value.

Also, controlling the first current to be greater than the predetermined first value can include controlling a current generating circuit coupled to the connection line to generate extra current, such that the first current is greater than the predetermined first value. The control method can further include controlling the inversion circuit to switch to a third inversion state when the inversion circuit startup signal is active. In the third inversion state, the inversion circuit may provide power to AC side and the first current is always greater than the predetermined first value.

In some applications, the first current of the connection line between the output terminal of the power conversion circuit and the input terminal of the inversion circuit can be controlled based on the rapid shutdown signal. Then, the state of the power conversion circuit coupled to the photovoltaic panel may be controlled in accordance with the first current, such that the voltage of the connection line can meet preset requirements. Therefore, rapid shutdown of the photovoltaic power system can be achieved and associated system communication simplified.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of controlling a photovoltaic power system, the method comprising:
   a) controlling a first current flowing through a connection line between an output terminal of a power conversion circuit and an input terminal of an inversion circuit according to a rapid shutdown signal;
   b) controlling operation states of said power conversion circuit coupled to a photovoltaic panel in accordance with said first current, such that a voltage on said connection line meets preset requirements; and
   c) controlling said inversion circuit to transition to a first inversion state when an inversion circuit startup signal is active, wherein said inversion circuit provides power to an AC side, and said first current is greater than a predetermined first value in said first inversion state.

2. The method of claim 1, wherein said controlling said operation states of said power conversion circuit in accordance with said first current comprises controlling said power conversion circuit to transition to a first operation state when said first current is less than a predetermined first value for a predetermined time, wherein an output voltage of said power conversion circuit decreases to a first preset value in said first operation state.

3. The method of claim 2, wherein said first preset value is a minimum output voltage of said power conversion circuit.

4. The method of claim 2, wherein said controlling said operation states of said power conversion circuit in accordance with said first current comprises controlling said power conversion circuit to switch to a second operation state when said first current transitions from a value less than said predetermined first value to a value greater than said predetermined first value, wherein an output voltage of said power conversion circuit increases to a second preset value.

5. The method of claim 1, wherein said controlling said first current based on said rapid shutdown signal comprises controlling said inversion circuit to transition to a second inversion state when said rapid shutdown signal is active, wherein said inversion circuit is out of operation in said first second inversion state, such that said first current decreases to zero.

6. The method of claim 1, wherein said controlling said first current based on said rapid shutdown signal comprises controlling said first current to be greater than a predetermined first value when both said rapid shutdown signal and an inversion circuit startup signal are inactive.

7. The method of claim 6, wherein said controlling said first current to be greater than said predetermined first value comprises:
   a) controlling said inversion circuit to transition to a third inversion state; and
   b) controlling said inversion circuit to sink said first current at least once, such that said first current is greater than said predetermined first value during each sinking current period.

8. The method of claim 6, wherein said controlling said first current to be greater than said predetermined first value comprises controlling a current generating circuit coupled to said connection line to generate an extra current, such that said first current is greater than said predetermined first value.

9. A photovoltaic power system, comprising:
   a) an inversion circuit configured to be controlled to regulate a first current of an input line of said inversion circuit, and to transition to a first inversion state when an inversion circuit startup signal is active, wherein said inversion circuit provides power to an AC side, and said first current is greater than a predetermined first value in said first inversion state; and
   b) at least one power conversion circuit coupled in series with said input line, and being configured to transition among different operation states according to said first current.

10. The system of claim 9, wherein said power conversion circuit is configured to transition to a first operation state when said first current is less than a predetermined first value for a predetermined duration, and wherein an output voltage of said power conversion circuit decreases to a first preset value in said first operation state.

11. The system of claim 10, wherein said first preset value is configured as a minimum output voltage of said power conversion circuit.

12. The system of claim 10, wherein said power conversion circuit is configured to transition to a second operation state when said first current switches from a value less than said predetermined first value to a value greater than said predetermined first value, and wherein an output voltage of said power conversion circuit increases to a second preset value in said second operation state.

13. The system of claim 9, wherein said inversion circuit is configured to transition to a second inversion state when a rapid shutdown signal is active, wherein said inversion circuit is out of operation in said second inversion state, such that said first current decreases to zero.

14. The system of claim 9, wherein said inversion circuit is controlled to transition to a third inversion state when a rapid shutdown signal and an inversion circuit startup signal are inactive, wherein said inversion circuit is controlled to sink said first current at least once such that said first current is greater than said predetermined first value in each sinking current period, in said third inversion state.

15. The system of claim 9, further comprising a current generating circuit coupled to said input line, and being configured to generate an extra current when a rapid shutdown signal and an inversion circuit startup signal are inactive, such that said first current is greater than said predetermined first value.

16. A power conversion circuit coupled to a photovoltaic panel of a photovoltaic power system, the power conversion circuit comprising:
a) a power stage circuit;
b) a control circuit configured to control operation states of said power conversion circuit in accordance with a first current of an output line of said power conversion circuit;
c) wherein said control circuit is configured to control said power conversion circuit to switch to a first operation state when said first current is less than a predetermined first value for a predetermined duration;
d) wherein an output voltage of said power conversion circuit decreases to a first preset value in said first operation state; and
e) wherein said control circuit comprises a current detection circuit configured to generate an enable signal by comparing said first current against said predetermined first value, a timing circuit configured to time based on said enable signal and generate a state signal, and a reference signal generating circuit configured to adjust an output voltage reference signal of said power stage circuit based on said state signal, in order to adjust an output voltage of said power conversion circuit.

17. The power conversion circuit of claim 16, wherein said control circuit is configured to control said power conversion circuit to switch to a second operation state when said first current switches from a value being less than said predetermined first value to a value being greater than said predetermined first value, wherein an output voltage of said power conversion circuit increases to a second preset value in said second operation state.

* * * * *